Figure 1:
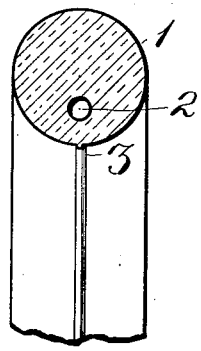

No. 890,624. PATENTED JUNE 16, 1908.
E. L. EASLICK.
VEHICLE TIRE.
APPLICATION FILED DEC. 26, 1905.

Witnesses,
Edna Bortz
Glenara Fox

Inventor,
E. L. Easlick,
by C. E. Humphrey
Atty.

UNITED STATES PATENT OFFICE.

EDWARD L. EASLICK, OF AKRON, OHIO, ASSIGNOR TO THE GOODYEAR TIRE & RUBBER COMPANY, OF AKRON, OHIO, A CORPORATION OF OHIO.

VEHICLE-TIRE.

No. 890,624.   Specification of Letters Patent.   Patented June 16, 1908.

Application filed December 26, 1905. Serial No. 293,281.

*To all whom it may concern:*

Be it known that I, EDWARD L. EASLICK, a citizen of the United States, residing at Akron, in the county of Summit and State of Ohio, have invented new and useful Improvements in Vehicle-Tires, of which the following is a specification.

This invention has relation to elastic vehicle tires, and the object thereof is to produce a tire preferably having a cylindrical outline and with an eccentric opening arranged longitudinally therein, through which may be passed a retaining wire or other suitable means for keeping the tire on its seat on the wheel-rim.

The invention aims to make the body of the tire preferably in substantially a perfect cylinder, in continuous lengths, and to place the opening for the reception of the tire retaining wire considerably below the actual center of the tire, in order to insure a perfect seating of the tire in the rim and to increase the thickness of the elastic material existing between the tread portion and the retaining means.

The invention also contemplates the placing on the tire of a strip of fabric for the twofold purpose of preventing wear on the elastic material from contact with the rim of the vehicle, and also to afford a suitable guide, to the person who places the tire in position on the wheel-rim.

It is also contemplated in this invention to force the tire stock, from which the tire is made previous to vulcanization, from a forming machine in continuous lengths, and simultaneously form therein by means of a mandrel, a suitable opening for the reception of the tire retaining wire or means, and also to place on the exterior of the tire stock such a distinguishing mark as will designate to the person handling the same, the exact relative position of the longitudinal opening therein, and it is designed that the strip of fabric which is used for preventing wear on the tire, and for locating the position of the opening therein, after vulcanization, shall be placed on the tire at the time it is placed in the molds for vulcanization, using the distinguishing mark on the tire as a guide, in order that the tire as ultimately vulcanized, will be provided with a longitudinal strip of fabric which covers and substantially conceals the distinguishing mark hereinbefore referred to.

As the tire is preferably made cylindrical, it is necessary that some means be used which will designate to the operator in placing the tire in the vulcanizing molds, the position of the longitudinal opening therein, in which is to be placed the retaining wire, and hence, I so form the die of the forming machine, that, as the tire issues therefrom, it will bear a distinguishing mark locating the position of the opening, so that in applying the fabric strip the mark will serve as a guide, and when the tire, after vulcanization, is being applied to a rim, the fabric itself will act as a means for determining the position of the opening for the retaining wire, as well as a means for preventing undue wear on the tire body.

With the foregoing and other objects in view, the invention consists of the novel construction, combination and arrangement of parts constituting the invention to be hereinafter referred to and illustrated in the accompanying drawings which form a part of this specification in which is shown the preferred embodiment of the invention, but it is to be understood that changes, variations and modifications can be resorted to which come within the scope of the claims hereunto appended.

Figure 2:
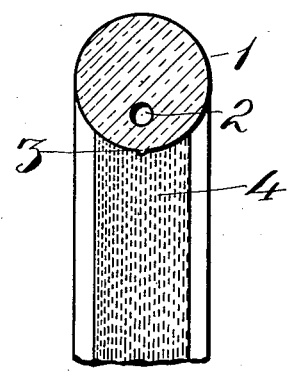

In the drawings, in which similar reference numerals indicate like parts in the different figures: Figure 1 is a transverse section of my improved tire as formed by the tire-forming machine; and, Fig. 2 is a view similar to Fig. 1 with a strip of fabric applied thereto.

In the drawings, the reference numeral 1 denotes the tire body, preferably made of vulcanized rubber, and throughout this body exists an opening 2, preferably eccentric and formed simultaneously with the body portion by means of a suitably-placed mandrel in the tire-forming machine. In making the die by which the tire stock is formed, I preferably so shape the same that a continuous mark such as a groove or ridge is produced on the exterior thereof. This mark is illustrated in the drawings by a ridge designated by the reference numeral 3. The position of this mark with respect to the position of the opening is immaterial, as long as it is definitely known. I prefer to place this mark in such a position that when a strip of fabric is placed on the tire body, it will effectually cover the mark. With this object in view, I generally locate the mark on that portion of the periphery of the tire which is nearest the opening 2. After the tire stock has been formed by the forming-machine, it is placed in the lower half of the mold in which it is to be vulcanized, and in placing this tire the operator is guided and assisted by the distinguishing mark which enables him to place the green unvulcanized stock in such a position that the wire opening 2 is straight. It will be stated that if this mark did not exist on the tire there would be no means by which the position of the opening in the stock could be ascertained; and hence, there would be no certainty that the opening would be vulcanized in a straight line. In placing this green stock in the mold, it is preferably so placed that the distinguishing mark is at the top or exposed, and the strip of fabric, designated in the drawings by the reference numeral 4, is placed thereon in such a position as to substantially cover and conceal the mark. The upper half of the mold is then placed in position and the tire subjected to vulcanization, which causes the perfect union of the fabric with the tire body and its complete incorporation therewith.

When the tire has been vulcanized and is ready to be applied to a wheel rim, the operator will be enabled to place the tire rapidly and easily in position, with that portion containing the opening 2 within the confines of said rim, using the strip of fabric as a guide. This strip of fabric is customarily so made that it will be wholly concealed by the rim and will effectually prevent wear on the tire, and the complete obscuring of the fabric by the wheel rim will serve to show to the person who places the tire in position that it is so located that the thickest portion of the elastic material is placed to encounter the wear incident to the use of the wheel.

Having thus described my invention, what I claim and desire to secure by Letters Patent, is:—

A tire for vehicle wheels, consisting of a cylindrical body of elastic material provided with an opening for the tire retaining means arranged eccentrically, and further provided with a distinguishing mark on the exterior thereof, whereby the position of said opening may be determined, and a strip of fabric adherent to said tire body covering said distinguishing mark.

In testimony whereof I have hereunto set my hand in presence of two subscribing witnesses.

EDWARD L. EASLICK.

Witnesses:
GEO. W. ROGERS,
CHAS. KLINE.